(12) United States Patent (10) Patent No.: US 7,556,278 B2
Roberts et al. (45) Date of Patent: Jul. 7, 2009

(54) FIFTH WHEEL HITCH ASSEMBLY INCORPORATING KING PIN DETECTION SYSTEM

(75) Inventors: Anthony S. Roberts, Granger, IN (US); Richard W. McCoy, Granger, IN (US); Thomas W. Lindenman, South Bend, IN (US)

(73) Assignee: Cequent Towing Products, Inc., Plymouth, MI (US)

( * ) Notice: Subject to any disclaimer, the term of this patent is extended or adjusted under 35 U.S.C. 154(b) by 222 days.

(21) Appl. No.: 10/557,510

(22) PCT Filed: May 19, 2004

(86) PCT No.: PCT/US2004/015712

§ 371 (c)(1),
(2), (4) Date: Dec. 4, 2006

(87) PCT Pub. No.: WO2004/106140

PCT Pub. Date: Dec. 9, 2004

(65) Prior Publication Data

US 2007/0194555 A1 Aug. 23, 2007

Related U.S. Application Data

(60) Provisional application No. 60/472,293, filed on May 21, 2003.

(51) Int. Cl.
*B62D 53/06* (2006.01)
(52) U.S. Cl. ..................................... 280/433
(58) Field of Classification Search ......... 280/432–434, 280/507, 509
See application file for complete search history.

(56) References Cited

U.S. PATENT DOCUMENTS

| | | | |
|---|---|---|---|
| 1,929,220 A | 10/1933 | Steinhauer |
| 1,982,914 A | 12/1934 | Hathorn |
| 1,996,162 A | 4/1935 | Lubbers |
| 2,027,990 A | 1/1936 | Lubbers |
| 2,138,679 A | 11/1938 | Sherman |
| 2,289,079 A | 7/1942 | Seyferth |
| 2,429,532 A | 10/1947 | Stephen |
| 2,501,884 A | 3/1950 | Apgar |
| 2,507,616 A | 5/1950 | Stephen |
| 2,513,117 A | 6/1950 | Stephen |
| 2,543,749 A | 3/1951 | Walther |
| 2,621,056 A | 12/1952 | Kayler |
| 2,663,575 A | 12/1953 | Ketel |
| 2,749,144 A | 6/1956 | Kayler |

(Continued)

*Primary Examiner*—Tony H. Winner
(74) *Attorney, Agent, or Firm*—McDonald Hopkins LLC (57) ABSTRACT

The present invention relates to a fifth wheel hitch assembly for mounting on a towing vehicle and receiving a king pin of a trailer. The fifth wheel hitch assembly includes a base assembly, a head assembly carried on the base assembly and a jaw assembly carried on the head assembly. The jaw assembly includes a jaw body displaceable between an open position and a closed position and a control handle connected to the jaw body. The fifth wheel hitch assembly also includes a lock for locking the jaw body in the closed position and a king pin indicator. The king pin indicator is displaceable between a home position in which the king pin indicator prevents engagement of the lock and a king pin sensing position which the lock may be engaged to lock the jaw body in the closed position.

20 Claims, 5 Drawing Sheets

U.S. PATENT DOCUMENTS

| | | | |
|---|---|---|---|
| 2,778,657 A | 1/1957 | Chaplin | |
| 2,779,605 A | 1/1957 | Braunberger | |
| 2,809,851 A | 10/1957 | Beck | |
| 2,856,203 A | 10/1958 | Kayler | |
| 2,925,286 A | 2/1960 | Hodges | |
| 3,073,624 A | 1/1963 | Thomas | |
| 3,198,549 A | 8/1965 | Martin | |
| 3,392,992 A | 7/1968 | Baker et al. | |
| 3,600,006 A * | 8/1971 | Slaven | 280/434 |
| 3,632,145 A | 1/1972 | Davis | |
| 3,647,248 A | 3/1972 | Ferris et al. | |
| 3,759,546 A | 9/1973 | Slaven | |
| 3,847,414 A | 11/1974 | Madura | |
| 3,868,127 A | 2/1975 | Marulic et al. | |
| 3,876,239 A * | 4/1975 | Jackson et al. | 280/432 |
| 4,017,095 A | 4/1977 | Best | |
| 4,208,062 A | 6/1980 | Maassen | |
| 4,227,713 A | 10/1980 | Blodgett et al. | |
| 4,447,070 A | 5/1984 | Inoue | |
| 4,721,323 A | 1/1988 | Czuk et al. | |
| 4,871,182 A | 10/1989 | Altherr et al. | |
| 4,892,324 A | 1/1990 | Spencer et al. | |
| 5,176,396 A * | 1/1993 | Hawthorne et al. | 280/434 |
| 5,509,682 A | 4/1996 | Lindenman et al. | |
| 5,516,137 A | 5/1996 | Kass et al. | |
| 5,529,329 A | 6/1996 | McCoy | |
| 6,100,794 A | 8/2000 | Hillier | |
| 6,302,424 B1 | 10/2001 | Gisinger et al. | |
| 6,682,089 B2 | 1/2004 | McCoy et al. | |
| 6,942,236 B2 | 9/2005 | Lindenman et al. | |
| 2002/0067025 A1 | 6/2002 | Gisinger et al. | |
| 2005/0077702 A1 | 4/2005 | Lindenman et al. | |

* cited by examiner

FIFTH WHEEL HITCH ASSEMBLY INCORPORATING KING PIN DETECTION SYSTEM

This is a U.S. National Stage Application of International Patent Application Ser. No. PCT/US04/015712 filed May 19, 2004, which claims priority to U.S. Provisional Patent Application Ser. No. 60/472,293 filed on May 21, 2003.

This application claims the benefit of U.S. Provisional Patent Application Ser. No. 60/472,293 filed on May 21, 2003.

TECHNICAL FIELD

The present invention relates generally to the trailer towing field and, more particularly, to an improved fifth wheel hitch assembly incorporating a king pin detection system.

BACK GROUND OF THE INVENTION

Fifth wheel hitches are well known to those in the trailer towing field. Various models of fifth wheel hitches have been manufactured and sold by Cequent Towing Products, Inc. and its predecessor Reese Products, Inc. The fifth wheel hitches generally include base and mounting assemblies that are held in the bed and mounted to the frame of a pickup truck. The base assembly supports a head assembly including a skid plate and a locking jaw mechanism or assembly for securing the king pin of the trailer being towed in proper position with the weight of the trailer properly supported on the skid plate. An example of a fifth wheel hitch assembly incorporating such a structural arrangement is found in U.S. Pat. No. 5,509,682 to Lindenman et al., U.S. Pat. No. 5,529,329 to McCoy and U.S. Pat. No. 4,721,323 to Czuk et al.

The present invention relates to an improved fifth wheel hitch assembly including a king pin detection system. More specifically, the assembly includes a structure for detecting the fill and proper seating of the trailer king pin in the head and jaw assemblies and for actually preventing locking of the jaw assembly in a closed or towing position in the event full and proper seating of the king pin is not detected.

SUMMARY OF THE INVENTION

In accordance with the purposes of the present invention as described herein, a fifth wheel hitch assembly is provided for mounting on a towing vehicle and receiving a king pin of a trailer. The fifth wheel hitch assembly includes a base assembly, a head assembly carried on the base assembly and a jaw assembly carried on the head assembly. The jaw assembly includes a jaw body displaceable between an open position and a closed position and a control handle connected to the jaw body. Means are provided for locking the jaw body in the closed position in engagement with the king pin of the trailer to allow towing. Further, the fifth wheel hitch assembly includes a king pin indicator for defeating the locking means when the king pin is not fully and properly seated in the head and jaw assemblies.

More specifically describing the invention, the locking means includes a locking bracket carried on the head assembly and a lock for engaging both the locking bracket and the control handle. The king pin indicator includes an elongated body having a king pin engaging end, a lock engaging end and an intermediate pivot point. The pivot point includes an aperture in the elongated body and a first pivot pin for pivotally connecting the king pin indicator to the head assembly. A spring connected between the king pin indicator and the head assembly biases the king pin indicator into a home position. In the home position the lock engaging end of the king pin indicator is oriented to defeat the locking means and thereby prevent the locking of the jaw body in the closed or towing position.

Still further describing the invention the head assembly includes a skid plate and a mounting platform. Further, a second pin is provided for pivotally connecting the jaw body to the mounting platform of the head assembly.

Alternatively, the fifth wheel hitch assembly of the present invention may be described as comprising a base assembly, a head assembly carried on the base assembly and a jaw assembly carried on the head assembly. The jaw assembly includes a jaw body displaceable between an open position and a closed position. A lock is provided for locking the jaw body in the closed position. A king pin indicator is displaceable between a home position in which the king pin indicator prevents engagement of the lock and a king pin sensing position in which the lock may be engaged to lock said jaw body in the closed position.

Further describing the invention, the head assembly includes a locking bracket. The lock engages the locking bracket and the jaw assembly when locking the jaw body in the closed position. More specifically, the jaw assembly includes a control handle that is connected to the jaw body. Cooperating apertures are provided in both the locking bracket and the control handle. The lock engages the apertures in these structures when locking the jaw body in the closed position. Still further, the fifth wheel hitch assembly includes a mounting assembly that carries the base assembly and is adapted for mounting to the frame of the towing vehicle, such as in the bed of a pickup truck.

In accordance with yet another aspect of the present invention, a method of indicating proper seating of a king pin in a head assembly and a jaw assembly of a fifth wheel hitch assembly is provided. That method includes the steps of detecting if the king pin is fully and properly seated in the head and jaw assemblies and preventing locking of the jaw assembly in a closed or towing position if full and proper seating of the king pin is not detected.

Still other features and advantages of the present invention will become readily apparent to those skilled in this art from the following description wherein there is shown and described a preferred embodiment of this invention simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrate several aspects of the present invention, and together with the description serve to explain certain principles of the invention. In the drawings.

Reference will now be made in detail to the present preferred embodiment of the invention, an example of which is illustrated in the accompanying drawings.

DETAILED DESCRIPTION OF THE INVENTION

Figure 1:
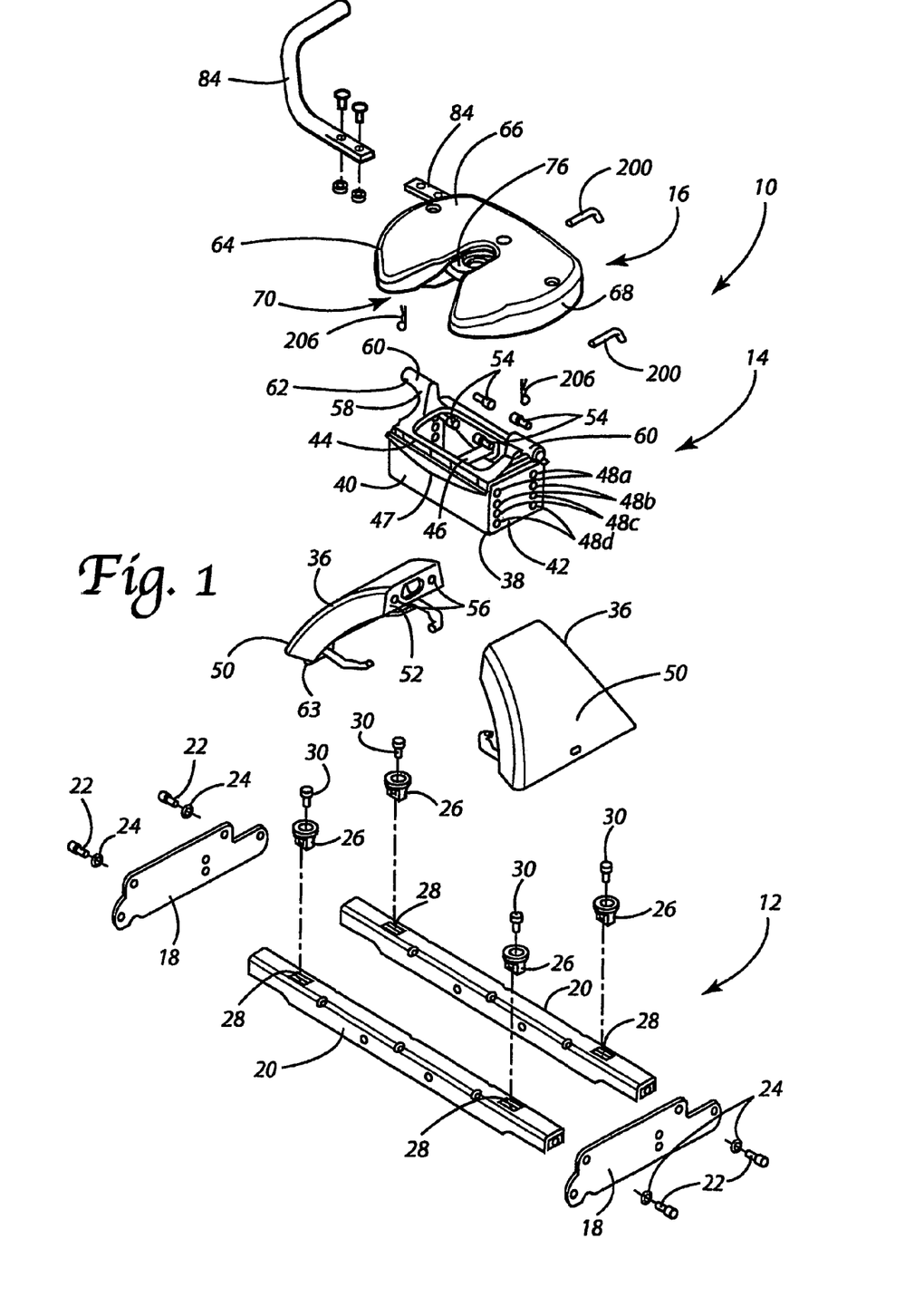
FIG. 1 is an exploded perspective view of the fifth wheel hitch assembly of the present invention.

Reference is now made to FIG. 1 illustrating the fifth wheel hitch assembly 10. That assembly 10 includes a mounting assembly, generally designated by reference numeral 12, an arched base assembly, generally designated by reference numeral 14, and a head assembly, generally designated by reference numeral 16. As illustrated the mounting assembly 12 includes first and second mounting brackets 18 connected together by a pair of cross bars 20 by means of bolts 22 and lock washers 24. Of course, while bolts 22 and lock washers 24 are shown, other types of fasteners (e.g. screws) or fastening processes (e.g. welding) could be utilized.

The mounting assembly 12 may be secured through the mounting brackets 18 to the frame of a vehicle so that the cross bars 20 lie immediately below the bed of that vehicle. Any appropriate fasteners (e.g. cooperating nuts and bolts) or fastening processes (e.g. welding) known in the art to be useful for this purpose may be utilized. As illustrated, each of the cross bars 20 includes a pair of feet receiving sockets 26 mounted in apertures 28 by means of bolts 30 that threadedly engage the cross bars.

The base assembly 14 is of modular configuration and comprises first and second arched legs 36 and a central housing 38. More particularly, the central housing 38 includes first and second end walls 40 and first and second sidewalls 42. A rocker 44 is received in and pivotally connected to the central housing 38. More specifically, the rocker 44 pivots freely about a stationary pivot pin or trunion 46 including opposing ends welded in apertures 47 in the two end walls 40 of the central housing 38. As a result of this arrangement the rocker, 44 pivots freely from side to side with respect to the central housing 38.

The sidewalls 42 of the central housing 38 each include a series of spaced mounting points 48a-48d. In the illustrated embodiment, the mounting points 48a-48d comprise a first series of vertically spaced apertures in the first sidewall 42 and a second series of vertically spaced apertures in the second, opposite sidewall 42.

As further illustrated, each leg 36 includes an outer section 50 and an inner section or mounting wall 52 that nests with and is welded in the outer section 50. Fasteners 54 in the form of bolts are utilized to secure the legs 36 to the sidewalls 42 of the central housing 38. More particularly, the bolts 54 are inserted through any one set of the series of vertically spaced mounting apertures 48a-48d and threadedly engaged in the apertures 56 in the inner section or mounting walls 52 of the legs 36. As should be appreciated, the height of the central housing 38 relative to the legs 36 may be adjusted depending upon which set of the series of vertically spaced mounting apertures 48a-48d is selected to complete the connection.

The arched legs 36 have a radius of curvature that may be constant or may vary over the length of the legs 36. Advantageously, the arched base assembly 14 provides not only added strength but also better and more favorable distribution of the trailer weight across the fifth wheel hitch assembly 10 and the towing vehicle. Further, the modular design of the base assembly 14 means that the legs 36 may be utilized with other central housing sections 38 including those not incorporating a rocker 44 and/or those incorporating other structures perhaps more suited for particular towing applications. As further illustrated, the rocker 44 includes two upstanding posts 58. Each of the posts 58 carries a trunion 60. As illustrated, the first and second trunnions 60 project outwardly in opposing directions. Each of the trunnions 60 includes an undercut groove 62. The head assembly 16 is pinned to the base assembly 14 by a pair of pins 200. Each pin 200 extends through one of the grooves 62 and a pair of apertures 202 in the wall of a cradle 204 that rests on each trunnion 60 (see also FIG. 2). A clip-206 secures each pin 200 in position.

The base assembly 14 is connected to the mounting assembly 12 by means of four feet 63 (only one illustrated), two on each leg 36. More specifically, the feet 63 are received and locked in the sockets 26 in substantially any manner known in the art. One such structural arrangement is described in detail in copending patent application Ser. No. 10/465,773, filed Jun. 19, 2003 and entitled Fifth Wheel Hitch Assembly. The full disclosure of this copending application published on Nov. 13, 2003 under Publication No. US-2003-0209878-A1 is hereby incorporated herein by reference.

Figure 2:
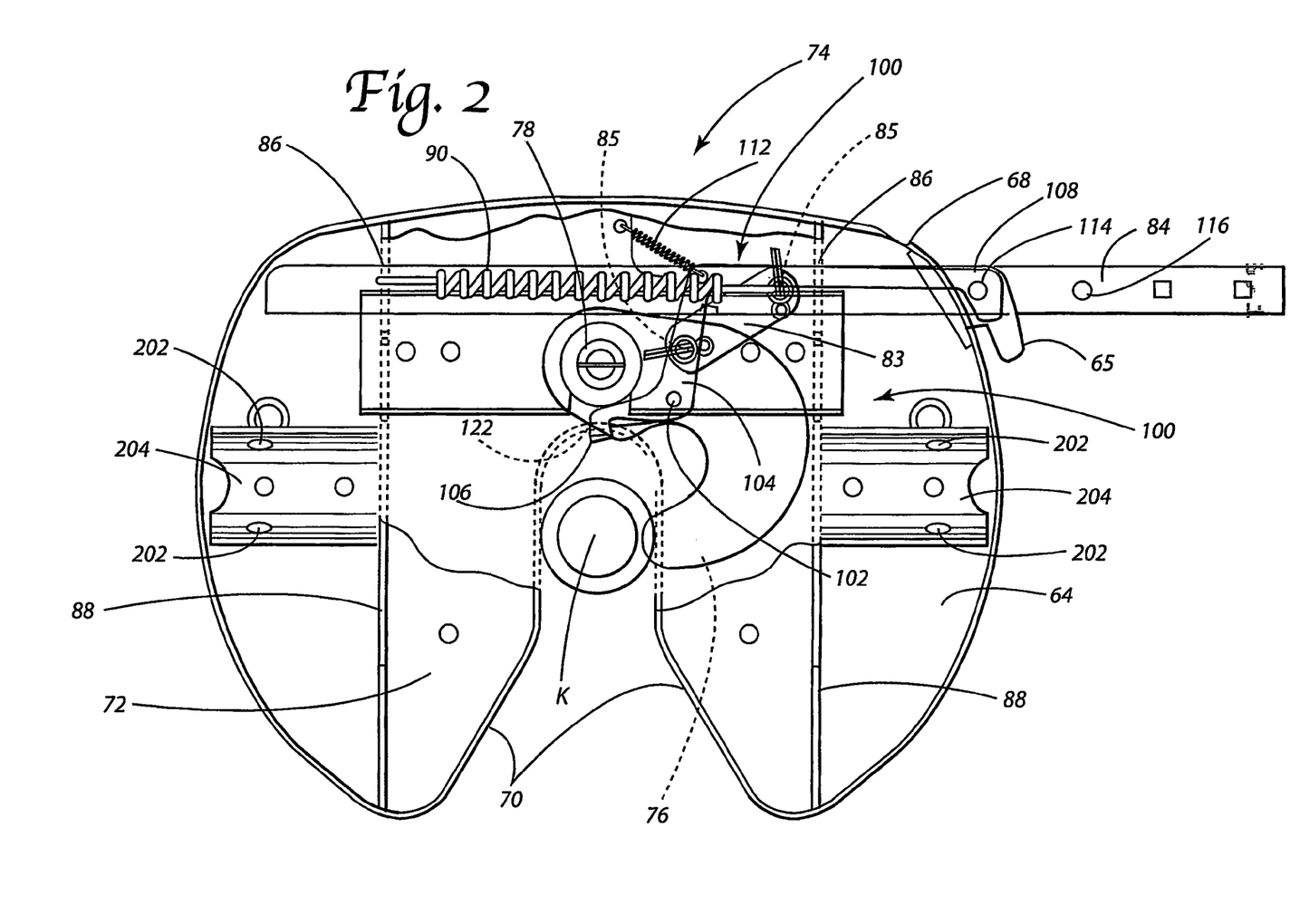
FIG. 2 is a bottom plan view of the head assembly illustrating the king pin indicator in the home position with the end of the king pin indicator blocking the locking apertures in the locking bracket and control handle.
Figure 3:
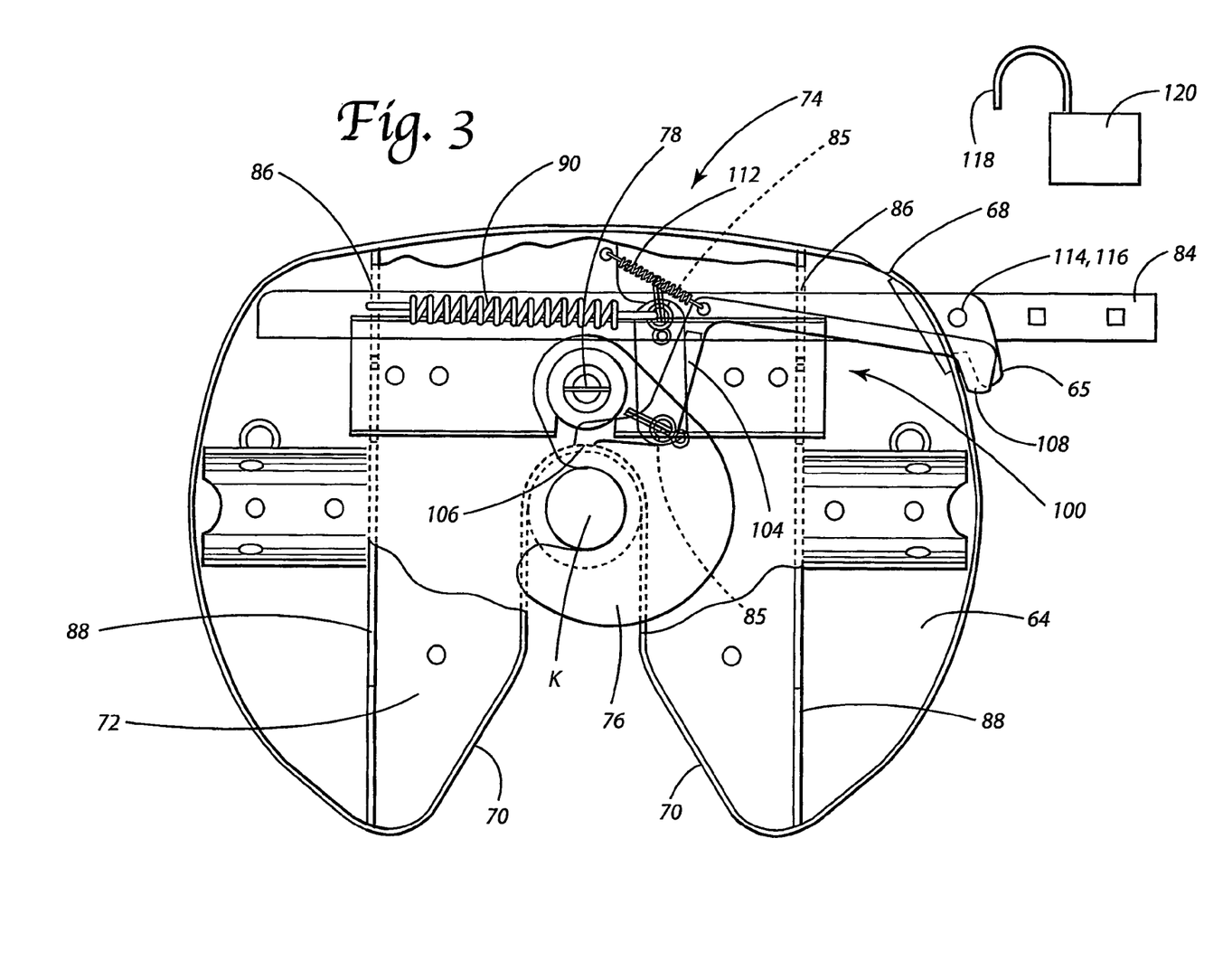
FIG. 3 is a bottom plan view similar to FIG. 2 but illustrating the king pin fully and properly seated in the head and jaw assemblies and the king pin indicator in the king pin sensing position allowing the lock to be engaged to lock the jaw body in the closed position around the king pin.
Figure 4:
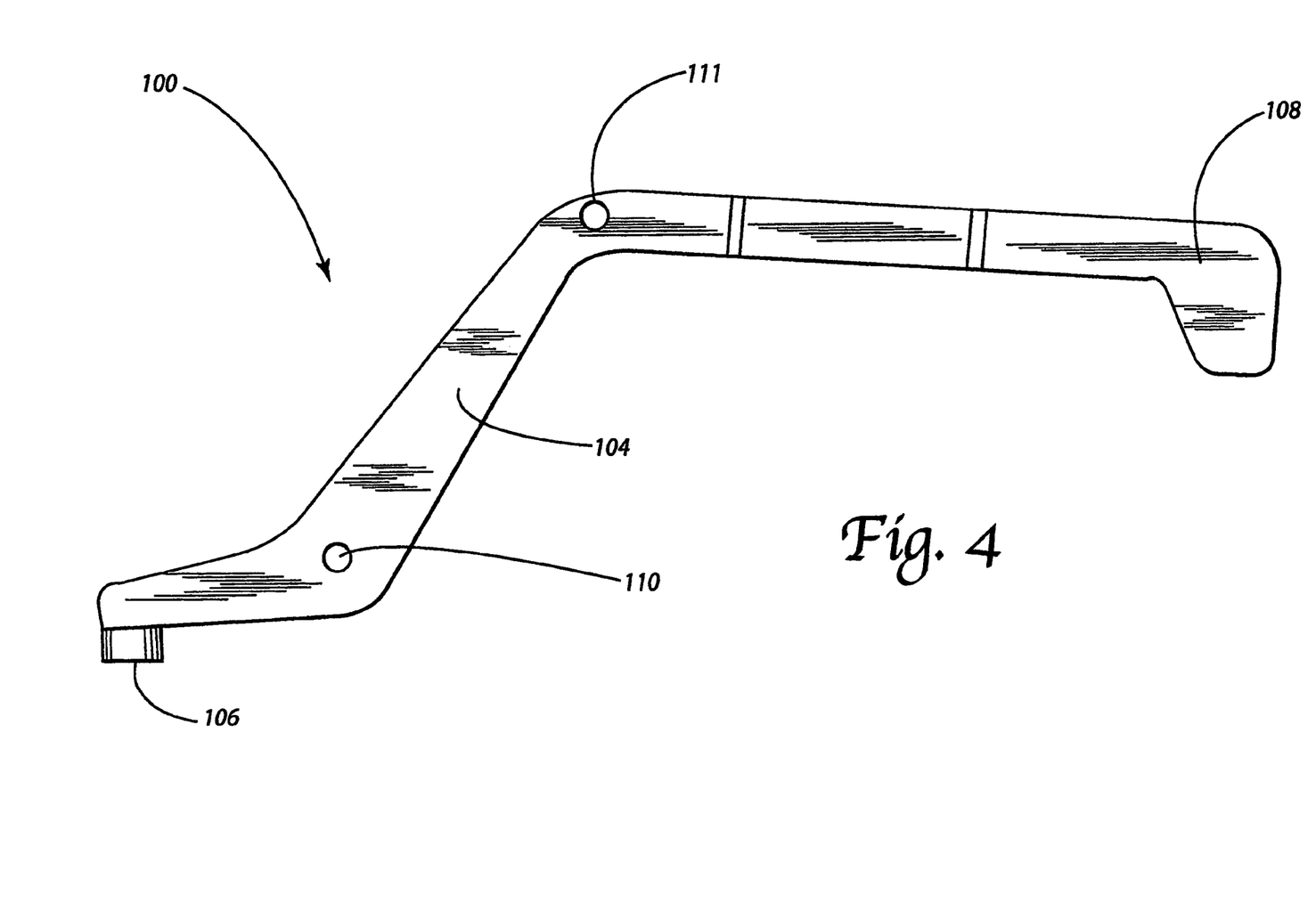
FIG. 4 is a detailed top plan view of the king pin indicator.

As illustrated in FIGS. 1-3 the head assembly 16 includes a skid plate 64 and a locking bracket 65 welded to the skid plate. The skid plate 64 has a top wall 66 and an integral downwardly depending peripheral skirt 68 defining a hidden cavity beneath the top wall. A throat 70 functions to receive the king pin K of a trailer. Advantageously, the downwardly depending peripheral skirt 68 extends around the entire throat or king pin engaging envelope 70 in order to provide added strength and rigidity to the skid plate 64 around the king pin. In other words, the resulting rolled edge provides an increased pin bearing area for added strength.

It should also be appreciated that the throat 70 is wider at the entry (i.e. about eight inches in width instead of the industry standard six inches). More specifically, the throat is about 2.67 times wider at its entry than at its closed end, thereby tapering from about eight inches in width to three inches in width. This allows the operator to more easily align and connect the towing vehicle to the king pin of a trailer as it provides for a wider, acceptable approach angle. This is a significant benefit when seeking to connect to a trailer in areas of limited vehicle clearance. Such areas may be encountered in the operator's driveway and/or garage as well as at remote locations such as camp sites and trailer parks.

As best illustrated in FIG. 2, a mounting platform 72 is carried by the skid plate 64 and is held in the hidden cavity. A jaw assembly 74 is connected to and carried by the mounting platform 72. More specifically, a jaw body 76 is pivotally secured to the mounting platform 72 by means of a pivot pin 78 that is received in an aperture in the jaw body and secured in an aperture in the mounting platform. A control handle 84 is received for free sliding movement through two slots 86 in opposing walls 88 of the mounting platform 72. A connecting link 83 and a pair of pivot pins 85 connect the control handle 84 to the jaw body 76. A tension spring 90 biases the jaw body 76 into the closed position illustrated in FIG. 3. The spring 90 includes a first end connected to the jaw body 76 and a second end connected to the mounting platform 72 at one of the walls 88.

During construction, the jaw assembly 74 is mounted to the inner mounting platform 72 and then the mounting platform is welded or otherwise secured to the underside of the skid plate 64 in the cavity where it is hidden from view by the downwardly depending skirt 68.

As best illustrated in FIGS. 2-5, a king pin indicator 100 is pivotally connected to the mounting platform 72 of the head assembly 16 by means of a pivot pin 102. The king pin indicator 100 includes an elongated body 104 having a king pin engaging end 106, a lock engaging end 108 and an intermediate pivot point in the form of an aperture 110 that receives the pivot pin 102. A tension spring 112 has a first end connected to the body 104 of the king pin indicator 100 at the aperture 111 and a second end connected to the skid plate 64 or mounting platform 72. As a consequence, the spring 112 functions to bias the king pin indicator 100 to the home position illustrated in FIG. 2.

Figure 5:
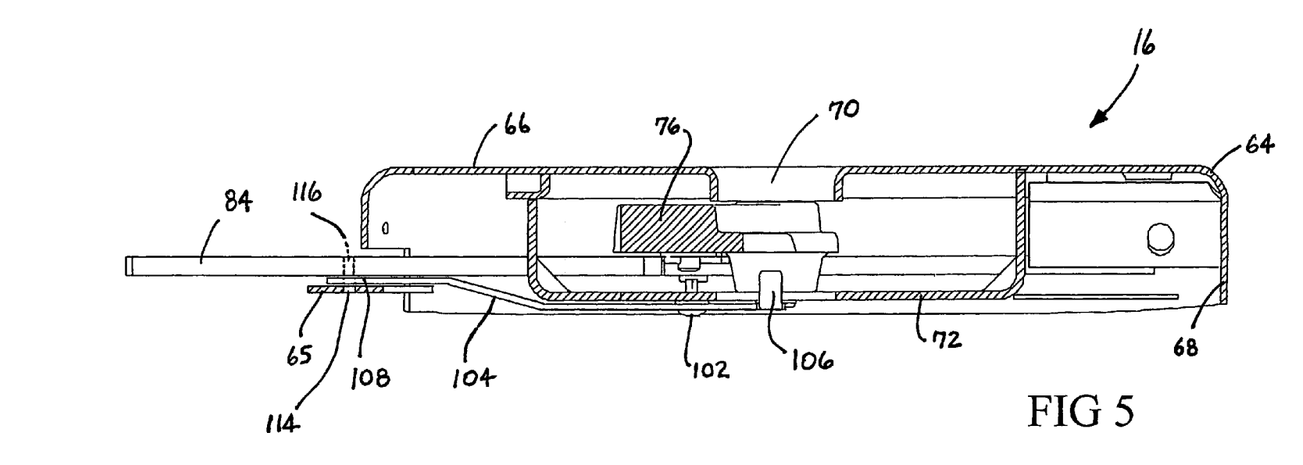
FIG. 5 is a detailed and combined cross sectional and bottom plan view showing the control handle, king pin indicator, bracket and other components of the invention.

As best illustrated in FIGS. 2, 3 and 5, the locking bracket 65 includes a first aperture 114 and the control handle 84 includes a second aperture 116. The two apertures 114 and 116 are aligned when the jaw body 76 is in the fully closed position. Accordingly, a connecting pin or bolt 118 of a padlock 120 may be engaged in the two apertures to secure the jaw body 76 in the fully closed position. Advantageously, the king pin indicator 100 ensures that the locking of the jaw body 76 in the fully closed position may only be accomplished when the king pin of a trailer being towed is fully and properly seated on the skid plate 64 and in the jaw assembly 74.

More specifically, as illustrated in FIG. 2, in the absence of a fully and properly seated king pin, the spring 112 functions to bias the body 104 of the king pin indicator 100 into a home position wherein the lock engaging end 108 is positioned in alignment between the apertures 114, 116 in the locking bracket 65 and the control handle 84. Thus, the end 108 blocks the apertures 114, 116 and defeats the locking mechanism (i.e. physically prevents insertion of a connecting pin or bolt 118 of a padlock 120 into the apertures).

In contrast, as illustrated in FIG. 3, when a fully and properly seated king pin K is present in the throat 70, the spring 90 biases the jaw body 76 to the fully closed position and the king pin K engages the end 106 of the king pin indicator 100. As a consequence, the king pin indicator 100 is pivoted about the pivot pin 102 against the force of the biasing spring 112 until the end 106 is received in the notch 122 in the mounting platform 72. In this king pin sensing position, the end 108 is pivoted away from the aligned apertures 114, 116 which as a consequence are fully open to receive the bolt 118 of the padlock 120. When the bolt 118 is engaged in the apertures 114, 116 in the locking bracket 65 and the control handle 84 and the padlock 120 is latched, the jaw body 76 is secured in the closed position in engagement with the fully and properly seated trailer king pin K. Thus, the fifth wheel hitch assembly 10 is then ready for towing.

In summary, numerous benefits result from employing the concepts of the present invention. Advantageously, the king pin indicator 100 includes a lock engaging or defeating end 108 that positively, physically prevents the locking of the jaw body 76 in the closed position unless the trailer king pin K is fully and properly seated on the skid plate 64 and in the jaw assembly 74. The resulting positive physical prevention or defeat of the locking mechanism is a significantly better indicator of an improperly seated king pin than a simple visual indicator that does not positively prevent locking. This is because an operator may forget to check or overlook a simple visual indicator and that cannot happen with the present invention where the actual locking is defeated.

The foregoing description of the preferred embodiment of the invention has been presented for purposes of illustration and description. It is not intended to be exhaustive or to limit the invention to the precise form disclosed. Obvious modifications or variations are possible in light the above teachings. The embodiment was chosen and described to provide the best illustration of the principles of the invention and its practical application to thereby enable one of ordinary skill in the art to utilize the invention in various embodiments and with various modifications as are suited the particular use contemplated. All such modifications and variations are within the scope of the invention as determined by the appended claims when interpreted in accordance with the breadth, to which they are fairly, legally and equitably entitled. The drawings and preferred embodiment do not and are not intended to limit the ordinary meaning of the claims and their fair and broad interpretation in any way.

What is claimed is:

1. A fifth wheel hitch assembly, comprising:
    a head assembly;
    a jaw assembly carried on said head assembly, said jaw assembly including a jaw body displaceable between an open position and a closed position;
    a control handle connected to said jaw body, said control handle including a first lockable device;
    a locking bracket attached to said head assembly, said locking bracket including a second lockable device lockable to said first locking device;
    a king pin indicator connected to said head assembly, wherein said king pin indicator prevents said first and second lockable devices from being locked together when a king pin is not fully and properly seated in the head and jaw assemblies.

2. The fifth wheel hitch assembly of claim 1 further comprising a lock for engaging both said first and second lockable.

3. The fifth wheel hitch assembly of claim 2, wherein said king pin indicator includes an elongated body having a king pin engaging end, a lock engaging end and an intermediate pivot point.

4. The fifth wheel hitch assembly of claim 3, further including a spring connected between said king pin indicator and said head assembly for biasing said king pin indicator into a home position, said king pin indicator prevents said first and second lockable devices from being locked when in said home position.

5. The fifth wheel hitch assembly of claim 4, wherein said intermediate pivot point includes an aperture in said elongated body and a first pivot pin for pivotally connecting said king pin indicator to said head assembly.

6. The fifth wheel hitch assembly of claim 5, wherein said head assembly includes a skid plate and a mounting platform.

7. The fifth wheel hitch assembly of claim 6, further including a second pivot pin, said second pivot pin pivotally connecting said jaw body to said mounting platform.

8. The fifth wheel hitch assembly of claim 7, wherein said first pivot pin pivotally connects said king pin indicator to said mounting platform.

9. The fifth wheel hitch assembly of claim 1, wherein said first locking device includes a first aperture and said second locking device includes a second aperture, said first and second apertures capable of being locked when locking said jaw body in a closed position.

10. A method of indicating proper seating of a king pin in a head assembly having a first lockable device and a jaw assembly having a second lockable device of a fifth wheel hitch assembly, comprising:
    detecting if the king pin is seated in said head and jaw assemblies; and
    preventing locking of the jaw assembly in a closed or towing position if seating of the king pin is not detected by preventing said first and second lockable devices from being locked together.

11. The method of claim 10, further comprising locking said first and second lockable devices when the king pin is detected as being seated in said head and jaw assemblies.

12. A fifth wheel hitch assembly for mounting to a towing vehicle and receiving a king pin of a trailer, comprising:
- a base assembly;
- a head assembly carried on said base assembly, said head assembly including a first lockable device;
- a jaw assembly carried on said head assembly, said jaw assembly including a second lockable device lockable to said first lockable device;
- a king pin indicator displaceable between a home position in which said king pin indicator prevents said first and second lockable devices from being locked together and a king pin sensing position in which said first and second lockable devices may be locked together to lock said jaw body in a closed position.

13. The fifth wheel hitch assembly of claim 12, further including a mounting assembly that carries said base assembly.

14. The fifth wheel hitch assembly of claim 12, wherein said head assembly includes a locking bracket and said locking bracket includes said first locking device.

15. The fifth wheel hitch assembly of claim 14, wherein said jaw assembly includes a control handle connected to said jaw body and said control handle includes said second locking device.

16. The fifth wheel hitch assembly of claim 15, wherein said first locking device includes a first aperture and said second locking device includes a second aperture, said first and second apertures capable of being locked when locking said jaw body in said closed position.

17. The fifth wheel hitch assembly of claim 16, wherein said king pin indicator includes an elongated body having a king pin engaging end, a lock engaging end and an intermediate pivot point.

18. The fifth wheel hitch assembly of claim 17, further including a spring connected between said king pin indicator and said head assembly for biasing said king pin indicator into said home position, said king pin indicator prevents said first and second lockable devices from being locked when in said home position.

19. The fifth wheel hitch assembly of claim 18, wherein said pivot point includes an aperture in said elongated body and a first pivot pin for pivotally connecting said king pin indicator to said head assembly.

20. The fifth wheel hitch assembly of claim 19, wherein said lock engaging end of said king pin indicator at least partially blocks said first and second apertures when said king pin indicator is in said home position.

* * * * *

UNITED STATES PATENT AND TRADEMARK OFFICE
CERTIFICATE OF CORRECTION

| | | |
|---|---|---|
| PATENT NO. | : 7,556,278 B2 | Page 1 of 1 |
| APPLICATION NO. | : 10/557510 | |
| DATED | : July 7, 2009 | |
| INVENTOR(S) | : Anthony S. Roberts, Richard W. McCoy and Thomas W. Lindenman | |

It is certified that error appears in the above-identified patent and that said Letters Patent is hereby corrected as shown below:

Column 1, line 38, delete "fill" and insert --full--

Signed and Sealed this
Thirty-first Day of May, 2011

David J. Kappos
*Director of the United States Patent and Trademark Office*